United States Patent [19]

ter Wijlen

[11] 4,215,727
[45] Aug. 5, 1980

[54] PLASTIC WELL PIPE

[75] Inventor: Hendrikus ter Wijlen, Rj De Krim, Netherlands

[73] Assignee: Wavin B.V., Zwolle, Netherlands

[21] Appl. No.: 960,667

[22] Filed: Nov. 14, 1978

[30] Foreign Application Priority Data
Nov. 18, 1977 [NL] Netherlands ............. 7712759

[51] Int. Cl.² ............................................. F16L 9/18
[52] U.S. Cl. ................................. 138/112; 138/113; 138/114
[58] Field of Search ............. 138/112, 113, 114, 153, 138/148; 166/236; 405/43, 45

[56] References Cited

U.S. PATENT DOCUMENTS

| 1,305,915 | 6/1919 | Mack | 166/236 |
| 1,594,788 | 8/1926 | McLaughlin et al. | 166/236 |
| 2,681,111 | 6/1954 | Thompson | 166/236 |
| 3,532,132 | 10/1970 | Rubenstein | 138/153 |
| 4,033,381 | 7/1977 | Newman et al. | 138/114 |

Primary Examiner—Lenard A. Footland
Attorney, Agent, or Firm—Wigman & Cohen

[57] ABSTRACT

A plastic well pipe comprising an outer wall, an inner wall, and channels formed by longitudinally extending partitions being integral with the walls, the outer wall being provided with bores opening into the channels, while at certain points the inner wall has been removed for recovering liquid from the channels, which liquid flows into the channels through the bores.

10 Claims, 6 Drawing Figures

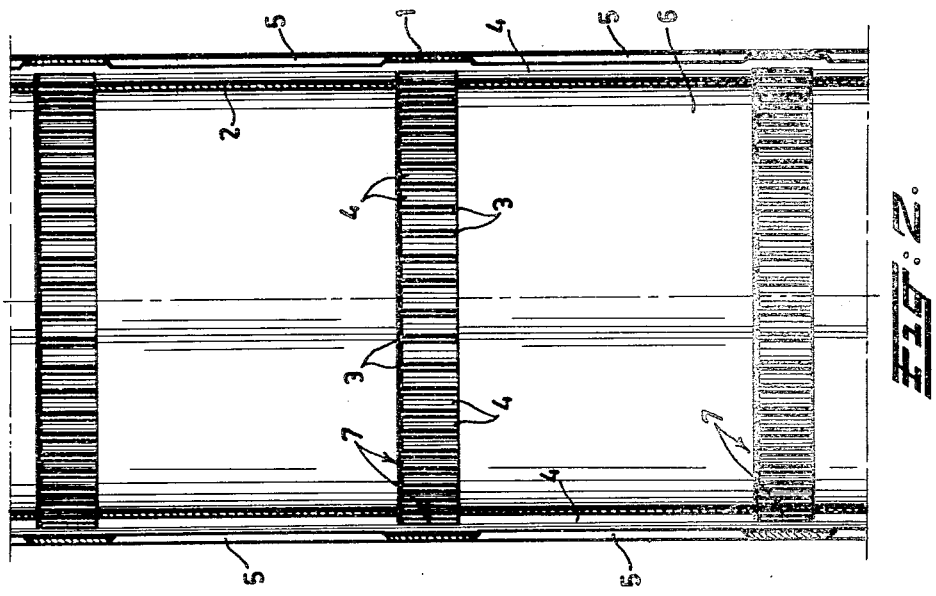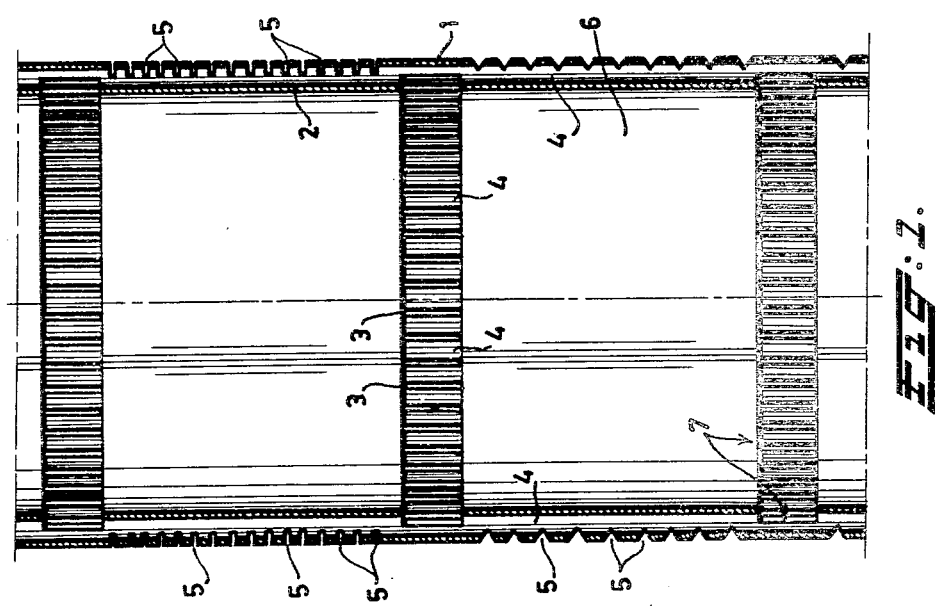

PLASTIC WELL PIPE

BACKGROUND OF THE INVENTION

The invention relates to a plastic well pipe comprising a perforated wall.

Plastic well pipes, which are used at great depths for recovering fluids, e.g. water or oil, are known.

A plastic well pipe is known, for example, which consists of a thermosetting resin re-inforced with glass filaments, the wall of said plastic well pipe comprising slots for the passage of water or oil. This plastic well pipe is disadvantageous, in virtue of the fact that reinforcing filaments are cut through when slots are formed in the wall of the pipe, thus causing a decrease in the strength of the pipe. This is particularly disadvantageous as these plastic well pipes are used at great depths where high strength properties are required so that the pipes are resistant to the pressures at those great depths.

In order to prevent a decrease in the properties of strength of such plastic well pipe, it has been suggested to wind the reinforcing filaments, in the form of glass filaments, in predetermined directions and to form the slots so that cutting through glass filaments occurs as little as possible. This pipe has the disadvantage that the manufacture requires much labor expenditure because the step of forming the slots in a predetermined direction, can only be performed by skilled laborers.

There is also known a plastic well pipe of thermoplastic, comprising slots or bores in the wall, but this pipe presents the disadvantage that the wall thickness of these plastic well pipes is very important in order to meet the strength requirements. This involves the use of a large amount of plastics, and the great weight of such pipes makes the handling of the pipes and the installation for recovering liquids, such as water or oil, extremely labor expensive.

SUMMARY OF THE INVENTION

The invention now aims to provide a plastic well pipe comprising a perforated wall, and meeting the prescribed strength requirements while using substantially less plastics in thermoplastic pipes, their installation being much more simple due to their lower weight. On the other hand, the wall thickness of fiber reinforced pipes may be made much thinner and this causes a substantial saving of resin.

The above aim is attained in accordance with the invention in that the plastic pipe comprises an inner wall and an outer wall, longitudinal connecting partitions being integral with the inner and outer wall extending thereinbetween, and the channels formed by the connecting partitions being connected to the outside of the channels through bores in a wall of said pipe.

Due to a lower hydraulic entrance resistance in consequence of a smaller penetration depth through the wall, the liquid is caused to flow easily through the bores in the longitudinal channels formed by connecting partitions, and subsequently to be discharged through the longitudinally extending channels.

Another advantage of the plastic well pipe according to the invention is that the cutting members used for forming the bores have a longer span of life because a thinner wall thickness has to be perforated.

Because above described channels have a relatively small cross section, they act as capillary channels so that larger quantities of liquids can be recovered than by means of the known plastic well pipes. The outer wall of the pipe is provided with apertures. The interior of the pipe comprises parts where the inner wall of the pipe is removed, thus causing liquid present in the channels to flow directly into the interior of the plastic well pipes.

In a very advantageous embodiment, the parts without an inner wall are annular parts which extend very expediently at the end of a plastic well pipe in accordance with the invention. These parts can also possibly be formed in a helical way in the pipe.

Though the connecting partitions may be straight partitions, in a very preferred embodiment the partitions are formed such that the longitudinal channels present a round or elliptical cross section, particularly a circular cross section.

The bores consist, expediently, of slots extending parallel to the longitudinal direction of the plastic well pipe.

Advantageously, the bores in the form of slots are helically applied around the outside of the pipe.

SURVEY OF THE DRAWINGS

FIG. 1 shows a longitudinal section of a first embodiment of a plastic well pipe according to the invention;

FIG. 2 shows a longitudinal section of a further embodiment of a plastic well pipe according to the invention.

DESCRIPTION OF A PREFERRED EMBODIMENT

Figure 3A:
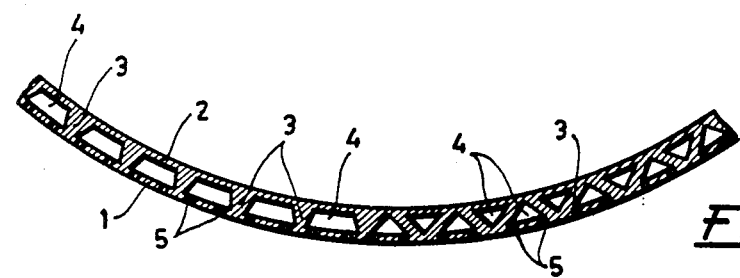
FIGS. 3a, 3b, 3c, and 3d show parts of possible cross sections of plastic well pipes according to FIGS. 1 and 2; however, the longitudinally extending connecting partitions are shaped differently.
Figure 3B:
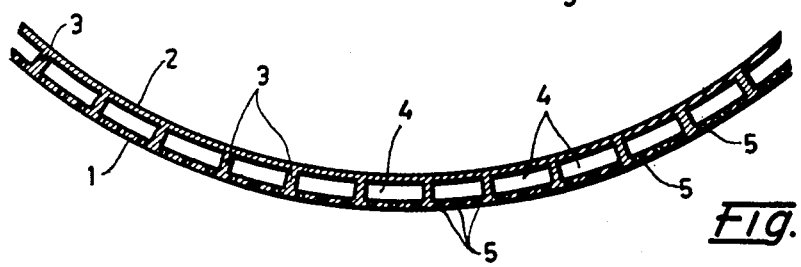
Figure 3C:
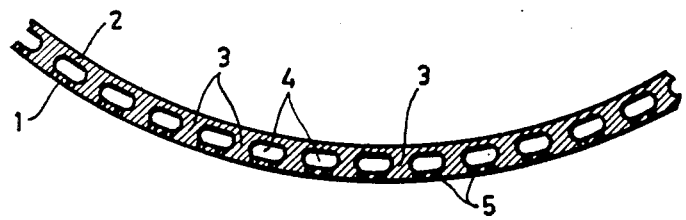
Figure 3D:
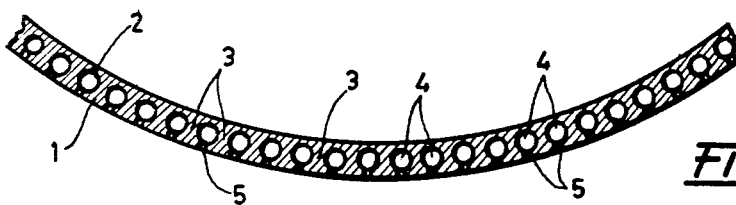

FIGS. 1 and 2 show a plastic well pipe of polyvinylchloride, in accordance with the invention, comprising an outer wall 1 and an inner wall 2, said inner wall and outer wall being interconnected by longitudinally extending partitions (see FIG. 3d). The connecting partitions are divided equidistantly along the circumference of the pipe.

The various longitudinally extending connecting partitions 3 form longitudinally extending channels 4 having a round cross section owing to the particular shape of the connecting partitions 3, as shown in FIG. 3d.

The outer wall of the pipe comprises bores in the form of slots 5, which extend longitudinally in FIG. 2, and which serve to connect the longitudinally extending channels 4 to the outside of the pipe. It will be clear that the form of the slots may vary and that they may also consist of small cylindrical bores. However, it has been found that slots provide a faster supply of liquid from the outer side of such a plastic well pipe toward the inner side of the channels.

The bores or perforations in the form of slots may have tangentially or helically extending shape, as shown in the upper part of FIG. 1. The lowermost part of the pipe is also provided with tangential slots, the slots now being conically-shaped.

In order to facilitate the discharge of liquid from the longitudinally extending channels 4 toward the inner side of the plastic well pipe according to the invention, the inner wall of the plastic well pipe has been removed in the annular parts 7, so that the liquid present in the channels 4 can flow directly into the interior of the plastic well pipe. These parts 7 can also extend helically with each pitch.

It has been found that very high yields can be obtained in using such plastic well pipes.

The annular parts without an inner wall are appropriately formed near the ends of a plastic well pipe in accordance with the invention since especially at the latter points, the inner wall of a similar plastic well pipe can be easily removed and, in a later connection of such a pipe with another pipe, at that point a socket is used as a connecting part which serves as a reinforcing pipe part.

FIG. 3a shows part of a cross section of a plastic well pipe in accordance with the invention, the longitudinaly extending connecting partitions 3 now being formed so that the channels 4 have a trapezedoical cross section.

It will be evident that connecting partitions 3 may be disposed, as shown in the right-hand part of FIG. 3a so, that the channels 4 present a triangular cross section. Slots 5 secure the supply of liquid to the channels.

FIG. 3b shows a further embodiment, the connecting partitions now being straight partitions and extending in a longitudinal direction while forming longitudinal channels 4 having a substantial rectangular cross section for receiving liquid. Slots 5 secure the desired liquid supply.

FIG. 3c shows a plastic well pipe according to the invention having channels 4 with an elliptical cross section, said channels being connected through slots 5 to the outside of the plastic pipe.

FIG. 3d finally shows a plastic well pipe in accordance with the invention having longitudinal channels 4 with a round cross section, whereby a plurality of longitudinal channels 4 are connected to the outside of the pipe through longitudinal slots 5.

It is obvious that an annular part of the inner wall of the plastic well pipe according to the invention need not be removed along the whole circumference but only at certain points of the inner wall. For that matter, greater and better strength as well as rigidity of the plastic well pipe in accordance with the invention, can be ensured under those circumstances.

Advantageously, the plastic well pipe in accordance with the invention consists of polyvinylchloride, but other rigid thermoplastics can also be used to that aim. Owing to the low cost price of polyvinylchloride, this thermoplastic is preferred. A plastic pipe of a fibre-reinforced thermosetting resin is, however, also extremely suitable for manufacturing a plastic well pipe according to the invention.

What is claimed is:

1. A plastic well pipe comprising an outer wall and an inner wall, longitudinal connecting partitions being integral with said inner and outer walls and extending thereinbetween, longitudinal capillary channels formed by the connecting partitions, said outer wall being perforated with bores, said bores opening at one end into said longitudinal capillary channels and at the other end into space outside of said outer wall whereby liquid flows through said bores and moves upwardly in said longitudinal channels by capillary action.

2. The plastic well pipe of claim 1, in which the connecting partitions are divided equidistantly along the circumference of the pipe.

3. The plastic well pipe of claim 1, in which the cross section of the channels is substantially rounded.

4. The plastic well pipe of claim 1, in which the bores are round.

5. The plastic well pipe of claim 1, in which the bores are slots extending parallel to the longitudinal axis of the pipe and opening into said longitudinal capillary channels.

6. The plastic well pipe of claim 1, in which the bores are applied helically around the circumference of the pipe.

7. The plastic well pipe of claim 1, in which the pipe consists of a thermoplastic, such as polyvinylchloride.

8. A plastic well pipe as defined in claim 8, in which annular parts of the inner wall have been removed at the end of the pipe so that liquid present in the longitudinal capillary channels may flow directly into the inside of the pipe.

9. A plastic well pipe as defined in claim 8, in which an annular part of the inner wall has been removed at the end of the pipe around the whole inner circumference thereof.

10. The plastic well pipe of claim 1, in which, at end parts of the pipe, an annular part of the inner wall has been removed so that liquid present in the longitudinal capillary channels may flow directly into the inside of the pipe.

* * * * *